United States Patent Office 3,711,512
Patented Jan. 16, 1973

3,711,512
PREPARATION OF 1-(AMINOALKYLAMINO)-4-HYDROXYMETHYLTHIOXANTHEN-9-ONES
David Rosi, Joseph C. Collins, and Theodore C. Miller, East Greenbush, N.Y., assignors to Sterling Drug Inc., New York, N.Y.
No Drawing. Filed Oct. 5, 1970, Ser. No. 78,222
Int. Cl. A61k 27/00; C07d 65/18
U.S. Cl. 260—328          4 Claims

ABSTRACT OF THE DISCLOSURE

A process for the preparation of 1-[$R_1R_2N$—Y—N(R)]-4-hydroxymethylthioxanthen-9 - one, schistosomacidal agents, which comprises reacting 1-[$R_1R_2N$—Y—N(R)]thioxanthen-9-one with excess formaldehyde at an acidic pH where R is hydrogen or methyl, $R_1$ and $R_2$ are each lower-alkyl, and Y is lower-alkylene having from two to four carbon atoms and having its two connecting linkages on different carbon atoms.

---

This invention relates to a process of preparing 1-(tert.-aminoalkylamino)thioxanthen-9-ones.

The invention comprises reacting 1-[$R_1R_2N$—Y—N(R)]thioxanthen-9-one with excess formaldehyde at an acidic pH to produce 1-[$R_1R_2N$—Y—N(R)]-4-hydroxymethylthioxanthen-9-one, where R is hydrogen or methyl, $R_1$ and $R_2$ are each lower-alkyl, and Y is lower-alkylene having from two to four carbon atoms and having its two connecting linkages on different carbon atoms. The compounds produced by said process are schistosomicidal agents, the compound where R is hydrogen, $R_1$ and $R_2$ is ethyl and Y is $CH_2CH_2$ being known as hycanthone. The products produced by said process are disclosed and claimed in U.S. Pat. No. 3,294,803, issued Dec. 27, 1966.

The process of the invention is presented structurally as follows:

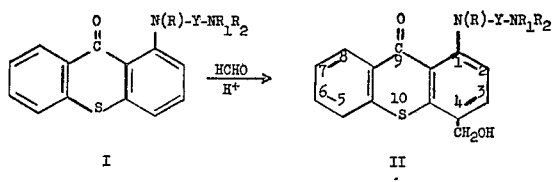

where R, $R_1$, $R_2$ and Y are defined as hereinabove.

The novel intermediates where R is hydrogen, i.e., 1-($R_1R_2N$—Y—NH)thioxanthen-9-ones, are disclosed and claimed in the Rosi and Collins copending application Ser. No. 78,224, filed Oct. 5, 1970.

The above novel intermediates where R is methyl, i.e., 1-[$R_1R_2N$—Y—N(R)]thioxanthen-9-ones, are disclosed and claimed in the Rosi and Collins copending application, Ser. No. 78,221, filed Oct. 5, 1970.

In the process of the invention the thioxanthen-9-one ring can bear from one to two substituents at positions 5, 6, 7 and 8 of the tricyclic ring selected from halo, lower-alkyl or lower-alkoxy; and, also, the di-(lower-alkyl) amino moiety, i.e., $NR_1R_2$, can be replaced by other lower-tertiary-amino groups, e.g., (lower-alkyl)-(lower-2-hydroxyalkyl)amino or by saturated N-heteromonocyclic radicals having five to seven ring atoms, illustrated by piperidino, hexamethyleneimino, pyrrolidino, morpholino, piperazino and lower-alkylated derivatives thereof.

The term "lower-alkylene," as used herein, e.g., as represented by Y in Formulas I and II, are alkylene radicals having from two to four carbon atoms and having its two connecting linkages on different carbon atoms, illustrated by

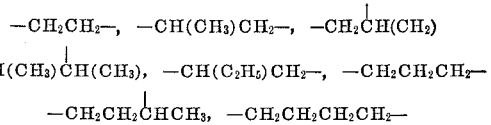

and the like.

The terms "lower-alkyl" and "lower-alkoxy," as used herein, mean alkyl and alkoxy radicals having from one to six carbon atoms, illustrated by methyl, ethyl, n-propyl, isopropyl, n-butyl, 2-butyl, isobutyl, n-amyl, n-hexyl, and the like, for lower-alkoxy.

The term "halo," as used herein, means chloro, bromo, iodo or fluoro, with chloro being preferred because of the ready availability and cost advantages of chloro intermediates.

When $NR_1R_2$ of Formulas I and II comprehend (lower-alkylated)-N-heteromonocyclic radicals, lower-alkyl radicals can be attached to any available ring-atom and can vary preferably from one to three in number, e.g., 2-methylpiperidino, 3-ethylpiperidino, 4-methylpiperidino, 2,6-dimethylpiperidino, 2,4-dimethylpiperidino, 2,4,6-trimethylpiperidino, 3-n-propylpiperidino, 2,2 - dimethylpiperidino, 2-methylpyrrolidino, 2,5-dimethylpyrrolidino, 2,3-dimethylmorpholino, 2 - ethylmorpholino, 2-methylhexamethyleneimino, 2,7 - dimethylhexamethyleneimino, 4-methylpiperazino, 3-ethylpiperazino, 2,4,6-trimethylpiperazino, and the like.

The manner and process of making and using the instant invention will now be geerally described so as to enable one skilled in the art of chemistry to make and use the same, as follows:

The reaction is carried out by reacting

1-[$R_1R_2N$—Y—N(R)]thioxanthen-9-one with excess formaldehyde at an acidic pH, that is, below 7.0, preferably up to about 6.5, to yield the corresponding 4-hydroxymethyl compounds. For the process where R is hydrogen, the preferred pH range is about 2.0 to 6.5 with the optimum pH range being about 4.0 to 6.5. The reaction is run between about 40° to 120° C., preferably btween about 80° to 100° C. An aqueous medium is preferred.

In the process where R is hydrogen the preferred pH is conveniently maintained using an acetic acid-alkali acetate buffer, sodium or potassium being preferred. Alternatively, said preferred pH is achieved without a buffer using acetic acid or other correspondingly weak acids, e.g., lactic acid, propionic acid, and the like. More acidic pH's, that is, less than 2.0, e.g., 0.5 or less, can be achieved using dilute mineral acids, e.g., hydrochloric acid, phosphoric acid, sulfuric acid, nitric acid, and the like; however, such more acidic pH's give lower yields of product in the process where R is H, although satisfactory yields are obtained at any acidic pH in the process where R is methyl. Said acidic pH is the essential feature of the process rather than any particular acid or salts used to achieve said pH.

The quantity of formaldehyde can vary widely provided it is present in excess of said intermediate 1-substituted-aminothioxanthen-9-one, that is, more than one molar equivalent quantity of formaldehyde being used per molar equivalent of said intermediate. In practice, a large excess, e.g., from about 20-fold to as much as 200-fold, was used; however, as little as a 2-fold excess and less of formaldehyde effected conversion of said intermediate to the corresponding 4-hydroxymethyl compound, although reaction time is longer. Because of its ready availability and low cost, 37% aqueous formaldehyde solution is preferred in practicing the invention.

The reaction can be conveniently followed by tlc. analyses.

The preparation of the novel intermediate 1-substituted-aminothioxanthen-9-ones, which are disclosed and claimed in copending applications referred to hereinabove, is illustrated hereinbelow in the specific exemplary disclosure.

The best mode contemplated for carrying out the invention is now set forth as follows:

EXAMPLE 1

1-(2-diethylaminoethylamino)-4-hydroxymethylthioxanthen-9-one

A 1.5 g. portion of 1-(2-diethylaminoethylamino)thioxanthen-9-one was dissolved in 50 ml. of 2.5 N sodium buffer at pH 5.5 and 20 ml. of 37% formaldehyde solution was added. The mixture was refluxed for three hours, cooled, made alkaline with 10 N aqueous sodium hydroxide solution and extracted with three 200 ml. portions of methylene dichloride. The combined extracts were evaporated to dryness and the residue applied to eight 20 x 40 cm. preparative silica gel plates which were then developed in a system of ethyl acetate(9): triethylamine(1), parts by volume. The bands corresponding to hycanthone, i.e., 1 - (2 - diethylaminoethylamino)-4-hydroxymethylthioxanthen-9-one, were removed and eluted with equal mixtures, by volume, of chloroform and methanol. Thin-layer chromatography of the eluant showed hycanthone plus some less polar impurities. The material was concentrated and rechromatographed on five preparative silica gel plates and eluted as above. There was thus obtained as an orange crystalline solid residue, 0.320 g. of 1-(2-diethylaminoethylamino)-4-hydroxymethylthioxanthen-9-one, M.P. 93–95° C. The infrared and nuclear magnetic resonance spectra of this product were in excellent agreement with corresponding spectral values for an authentic sample of 1-(2-diethylaminoethylamino)-4-hydroxymethylthioxanthen-9-one prepared by the enzymatic oxidation of the corresponding 4-methyl compound as shown in Example 1 of said U.S. Pat. 3,294,803.

The intermediate 1-(2-diethylaminoethylamino)-thioxanthen-9-one was prepared as follows: To 2 g. of 1-chlorothioxanthene-9-one was added excess 2-diethylaminoethylamine and 1.5 ml. of pyridine. The reaction mixture was refluxed for four and one-half hours, cooled and 100 ml. of xylene added. The mixture was washed with distilled water (4× 50 ml.) to remove unreacted amine. The xylene was then extracted with 15% aqueous acetic acid solution (3× 50 ml.). The combined acid extracts were made alkaline and extracted with benzene (3× 50 ml.). The combined benzene extracts were treated with decolorizing charcoal while drying over anhydrous sodium sulfate. The mixture was filtered and the filtrate concentrated under vacuum to yield, as an orange crystalline solid, 2.4 g. of 1-(2-diethylaminoethylamino)thioxanthen-9-one, M.P. 82–83° C.

EXAMPLE 2

1-[(2-diethylaminoethyl)methylamino]-4-hydroxymethylthioxanthene-9-one

A portion of 1-[(2-diethylaminoethyl)-methylamino]thioxanthen-9-one (prepared from 1 g. of 1-chlorothioxanthene-9-one as described hereinbelow) was dissolved in 75 ml. of 0.5 N hydochloric acid and 20 ml. of 36% formaldehyde solution was added. The reaction mixture was heated to a gentle boil for three hours, allowed to cool and then extracted with 100 ml. of methylene dichloride to remove any unreacted starting material. The reaction mixture was then made alkaline with 35% aqueous sodium hydroxide solution and extracted with two 100 ml. portions of methylene dichloride. The combined extracts were treated with decolorizing charcoal while drying over anhydrous sodium sulfate and then filtered. The filtrate was concentrated in vacuo to remove the solvent and the residue applied to four 20 x 40 cm. preparative silica gel plates which were then developed in a system of ethyl acetate(9):triethylamine(1), parts by volume, using two passes. Further purification was effected by eluting the material from the silica gel, removing the solvent, applying the residue to two 20 x 40 cm. preparative silica gel plates and developing the plates with ethyl acetate(5):n - hexane(4):triethylamine(1), using three passes. The product was eluted from the silica gel with a 50:50 mixture (by volume) of chloroform:methanol. The solvents were removed in vacuo and the residue dried in a vacuum oven over $P_2O_5$ at 50° C. for four hours to yield 0.48 g. of 1-[(2-diethylaminoethyl)methylamino]-4-hydroxymethylthioxanthen-9-one, whose structure was confirmed by its infrared, ultraviolet and nuclear magnetic resonance spectra.

The above intermediate 1 - [(2 - diethylaminoethyl)methylamino]thioxanthen-9-one was prepared as follows: A mixture containing 1 g. of 1-chlorothioxanthen-9-one, 4 ml. of N,N-diethyl-N'-methylethylenediamine and 1.5 ml. of pyridine was heated gently on a hot plate for two hours. The reaction mixture was dissolved in 10% aqueous acetic acid and extracted with 50 ml. of methylene dichloride. The acidic reaction mixture was set aside. Since the methylene dichloride extract also contained some product, as determined by tlc, it was evaporated in vacuo, the residue dissolved in 100 ml. of ether and the ether solution extracted with 5% aqueous acetic acid. This acetic acid extract was combined with the above acidic reaction mixture and the mixture made alkaline with 10 N aqueous sodium hydroxide solution and extracted with two 100 ml. portions of methylene dichloride. The combined methylene dichloride extracts were treated with decolorizing charcoal while drying over anhydrous sodium sulfate, filtered and the filtrate concentrated in vacuo to yield, as a yellow oil, 1-[(2-diethylaminoethyl)methylamino]thioxanthen-9-one.

Example 3

This preparation was carried out following the procedure described in Example 1 but using 100 mg. of 1-(2-diethylaminoethylamino)thioxanthen-9-one, 0.5 ml. of 5.0 N acetic acid, 5.0 ml. of 37% formaldehyde solution, a heating period on a steam bath for four hours, one chromatographic treatment using two 20 x 40 cm. Preparative silica gel plates in the work-up and further purification of the product as follows: The residue after the evaporation of the chloroform-methanol eluant was dissolved in methylene dichloride. The solution was washed with water, treated with decolorizing charcoal while drying over anhydrous sodium sulfate, filtered, and the filtrate evaporated in vacuo to yield 62 mg. (56% yield) of 1-(2-diethylaminoethylamino) - 4 - hydroxymethylthioxanthen-9-one. In an identical run the pH of the reaction mixture was found to be 4.2.

Example 4

This preparation was carried out as in Example 3 but using only 0.2 ml. of 5.0 N acetic acid. There was thus obtained 69 mg. (63% yield) of 1-(2-diethylaminoethylamino)-4-hydroxymethylthioxanthen-9-one. In an identical run the pH of the reaction mixture was found to be 4.7.

Example 5

This preparation was carried out as in Example 3 but using 0.1 ml. of 5.0 N acetic acid. There was thus obtained 66 mg. (60% yield) of 1-(2-diethylaminoethylamino)-4-hydroxymethylthioxanthen-9-one. In an identical run the pH of the reaction mixture was found to be 5.3.

Example 6

This preparation was carried out as in Example 3 but using 1.0 ml. of glacial acetic acid. The pH of the reaction mixture was found to be 3.1. The presence of the product, i.e., 1-(2-diethylaminoethylamino)-4-hydroxymethylthioxanthen-9-one or hycanthone, was determined by tlc. Refer to Example 11 for this same preparation using 10-fold quantities of the reactants and the acetic acid.

EXAMPLE 7

In a preparation carried out as in Example 6 but using 5.0 ml. of glacial acetic acid the pH was 1.9. The presence of the product hycanthone was determined by tlc.

EXAMPLE 8

In a preparation carried out as in Example 6 but using 0.6 ml. of 1 N hydrochloride acid the pH was 0.7. The presence of the product hycanthone was determined by tlc.

EXAMPLE 9

This preparation was carried out without the use of chromatography in the isolation of the product. One gram of 1-(2-diethylaminoethylamino)thioxanthen-9-one was dissolved in 5.0 ml. of 5 N sodium acetate buffer at pH 5.0 and 10.0 ml. of 37% formaldehyde solution was added. The reaction mixture was maintained at 40–45° C. in a water bath for ten days, made alkaline with sodium hydroxide solution and extracted with methylene dichloride (4× 50 ml.). The combined extracts were washed with 1 N aqueous sodium hydroxide solution, dried over anhydrous sodium sulfate and concentrated in vacuo to a volume of about 15 ml. Evaporated in vacuo was continued while simultaneously adding methanol until the methylene dichloride was completely replaced by methanol. A solid was filtered off, the filtrate was concentrated in vacuo and the methanol was replaced with toluene to a final volume of about 5 ml. The cooled solution yielded the crystalline product hycanthone which was collected and found to weigh 366 mg. (33% yield).

EXAMPLE 10

This preparation was carried out at a pH of 6.2. A 1.5 g. portion of 1-(2-diethylaminoethylamino)thioxanthen-9-one was dissolved in 25 ml. of 5.0 N sodium acetate buffer. The pH was adjusted to 6.2 with 10 N aqueous sodium hydroxide solution and 35 ml. of 37% formaldehyde solution was added. The mixture was heated at 80–90° C. for seven and one-half hours, allowed to stand overnight (about sixteen hours) and then refluxed an additional five and one-half hours. The reaction mixture was cooled, a separated solid was filtered off and the filtrate was made alkaline with 35% aqueous sodium hydroxide solution. The alkaline solution was extracted with methylene dichloride and the product hycanthone was isolated using two chromatographic treatments as in Example 1 using nine 20× 40 cm. preparative silica gel plates each time. There was thus obtained 603 mg. (36.7% yield) of hycanthone.

EXAMPLE 11

To 1.0 g. of 1-(2-diethylaminoethylamino)thioxanthen-9-one in 10 ml. of glacial acetic acid was added 50 ml. of 37% formaldehyde solution. The pH of the reaction mixture as in Example 6 was 3.1. The reaction mixture was heated on a steam bath for seventy-five minutes, made alkaline with 10 N aqueous sodium hydroxide solution and the alkaline solution extracted with methylene dichloride (4× 100 ml.). The combined extracts were washed with 1 N aqueous sodium hydroxide solution (3× 100 ml.), treated with decolorizing charcoal while drying over anhydrous sodium sulfate and filtered. The filtrate was concentrated in vacuo to a volume of about 20 ml. and the remaining methylene dichloride was replaced with an equal volume of boiling methanol; the solution was boiled for several minutes to ensure complete removal of the methylene dichloride. The methanol solution was then cooled and allowed to stand in a refrigerator overnight. The resulting crystalline solid was filtered off and the ethanol filtrate evaporated to dryness in vacuo. The resulting residue was recrystallized from 5 ml. of toluene, washed with small quantities of ether-n-pentane and dried in vacuo at 55° C. over phosphorus pentoxide for three hours to yield 400 mg. (36.6% yield) of hycanthone, M.P. 92–94° C.

While the invention has been illustrated with respect to the transformations leading to the preparation of compounds having 2-diethylaminoethylamino as the 1-substituent and having no substituents at ring-positions 5, 6, 7 or 8, it will be understood that homologs and analogs having other 1-substituents, for example, 2-dimethylaminoethylamine
3-diethylaminopropylamino
4-dimethylaminobutylamino
2-di-n-butylaminoethylamine
2-(ethylmethylamino)ethylamino
2-piperidinoethylamine
2-pyrrolidinoethylamino
2-(2,6-dimethylpiperidino)ethylamino
2-[N-ethyl-N-(2-hydroxyethyl)amino]ethylamino and the like, having ring-substituents, for example, 6-chloro, 7-chloro, 7-bromo, 5-chloro, 7-methyl, 7-ethoxy, 8-methoxy, 6,7-dimethoxy, 5,6,7-trimethyl, and the like, can be prepared in a completely analogous fashion.

We claim:
1. The process which comprises reacting

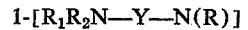

1-[$R_1R_2N$—Y—N(R)]

thioxanthen-9-one with excess formaldehyde at an acidic pH to produce 1-[$R_1R_2N$—Y—N(R)]-4-hydroxymethyl-thioxanthen-9-one, where R is hydrogen or methyl, $R_1$ and $R_2$ are each lower-alkyl and Y is lower-alkylene having from two to four carbon atoms and having its two connecting linkages on different carbon atoms.

2. The process according to claim 1 wherein R is hydrogen, $R_1$ and $R_2$ are each ethyl, Y is $CH_2CH_2$ and the pH is about 2.0 to 6.5.

3. The process according to claim 2 where the pH is about 4.0 to 6.5.

4. The process according to claim 1 where R is methyl, $R_1$ and $R_2$ are each ethyl, Y is $CH_2CH_2$ and the pH is up to about 6.5.

References Cited

UNITED STATES PATENTS 3,577,558  5/1971  Rosi _____ 260—328

HENRY R. JILES, Primary Examiner

C. M. S. JAISLE, Assistant Examiner

U.S. Cl. X.R.

260—247.1, 268 TR, 293.57, 326.82, 999